United States Patent
Zeng et al.

(10) Patent No.: US 11,924,436 B2
(45) Date of Patent: Mar. 5, 2024

(54) VIDEO ENCODING COMPLEXITY MEASURE SYSTEM

(71) Applicant: SSIMWAVE INC., Waterloo (CA)

(72) Inventors: Kai Zeng, Kitchener (CA); Kalyan Goswami, Waterloo (CA); Ahmed Badr, Waterloo (CA)

(73) Assignee: SSIMWAVE INC., Waterloo (CA)

( * ) Notice: Subject to any disclaimer, the term of this patent is extended or adjusted under 35 U.S.C. 154(b) by 192 days.

(21) Appl. No.: 17/173,902

(22) Filed: Feb. 11, 2021

(65) Prior Publication Data

US 2021/0258585 A1 Aug. 19, 2021

Related U.S. Application Data

(60) Provisional application No. 62/976,182, filed on Feb. 13, 2020.

(51) Int. Cl.
*H04N 19/146* (2014.01)
*H04N 19/184* (2014.01)

(52) U.S. Cl.
CPC ......... *H04N 19/146* (2014.11); *H04N 19/184* (2014.11)

(58) Field of Classification Search
CPC .......................... H04N 19/146; H04N 19/184
USPC .................................................. 375/240.02
See application file for complete search history.

(56) References Cited

U.S. PATENT DOCUMENTS

| | | | |
|---|---|---|---|
| 8,290,038 B1 | 10/2012 | Wang et al. | |
| 9,906,784 B2 | 2/2018 | Sun et al. | |
| 10,499,085 B1 | 12/2019 | Douady-Pleven et al. | |
| 2006/0256858 A1* | 11/2006 | Chin | H04N 19/15 375/240.03 |
| 2007/0081586 A1* | 4/2007 | Raveendran | H04N 19/40 375/240.1 |
| 2013/0272396 A1* | 10/2013 | Liu | H04N 19/176 375/240.12 |
| 2016/0295216 A1* | 10/2016 | Aaron | H04N 21/23439 |
| 2018/0041788 A1* | 2/2018 | Wang | H04N 19/164 |
| 2019/0158564 A1 | 5/2019 | Wang et al. | |

* cited by examiner

*Primary Examiner* — Ayman A Abaza
(74) *Attorney, Agent, or Firm* — Brooks Kushman, P.C.

(57) ABSTRACT

Classifying video for encoding optimization may include computing a content complexity score of a video, the content complexity score indicating a measure of how detailed the video is in terms of spatial and temporal information, categorizing the video into one of a plurality of buckets according to the content complexity score, each bucket representing a category of video content having a different range of content complexity scores and being associated with a ladder specific to the range, and encoding the video according to the ladder of the one of the plurality of buckets into which the video is categorized.

16 Claims, 5 Drawing Sheets

VIDEO ENCODING COMPLEXITY MEASURE SYSTEM

CROSS-REFERENCE TO RELATED APPLICATIONS

This application claims the benefit of U.S. provisional application Ser. No. 62/976,182 filed Feb. 13, 2020, the disclosure of which is hereby incorporated in its entirety by reference herein.

TECHNICAL FIELD

Aspects of the disclosure generally relate to video encoding complexity measure systems for use in optimization of video encoding.

BACKGROUND

Video encoding is a process of converting digital video files from one format to another. A bitrate is an amount of data conveyed per unit time. From a streaming perspective, the higher the bitrate, the higher the quality, and the more bandwidth that is required. Generally, the more complex the video, the lower the quality of encoded video will be when the same amount of bitrate is spent during the encoding. Thus, determining what bitrate to use to encode content can be a very important determination when it comes to optimizing encoding.

SUMMARY

In one or more illustrative examples, a method for classifying video for encoding optimization may include computing a content complexity score of a video, the content complexity score indicating a measure of how detailed the video is in terms of spatial and temporal information, categorizing the video into one of a plurality of buckets according to the content complexity score, each bucket representing a category of video content having a different range of content complexity scores and being associated with a ladder specific to the range, and encoding the video according to the ladder of the one of the plurality of buckets into which the video is categorized.

In one or more illustrative examples, a system for classifying video for encoding optimization includes a processor programmed to identify a complexity target bitrate of a video encoded at a target bitrate; compute a content complexity score of the video, the content complexity score indicating a measure of how detailed the video is in terms of spatial and temporal information; categorize the video into one of a plurality of buckets according to the content complexity score, each bucket representing a category of video content having a different range of content complexity scores and being associated with a ladder specific to the range; and encode the video according to the ladder of the one of the plurality of buckets into which the video is categorized.

In one or more illustrative examples, a non-transitory computer readable medium includes instructions for classifying video for encoding optimization, that, when executed by a processor of a computing device, cause the computing device to perform operations including to identify a complexity target bitrate of a video encoded at a target bitrate; compute a content complexity score of the video, the content complexity score indicating a measure of how detailed the video is in terms of spatial and temporal information; categorize the video into one of a plurality of buckets according to the content complexity score, each bucket representing a category of video content having a different range of content complexity scores and being associated with a ladder specific to the range; and encode the video according to the ladder of the one of the plurality of buckets into which the video is categorized.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3:
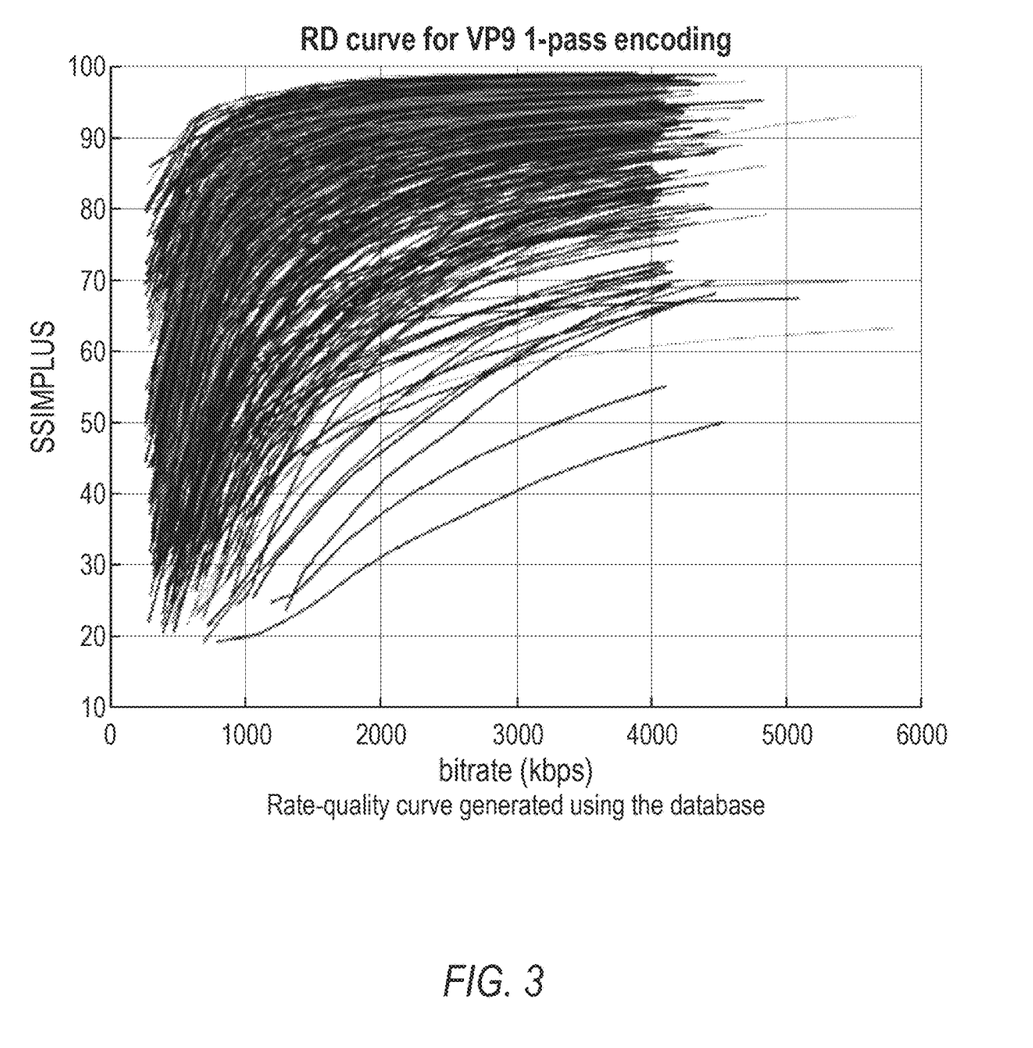
FIG. 3 illustrates an example graph of a rate-distortion curve generated by the codec 1-pass encoding.

In video encoding, the more complex the spatial and temporal content of the video, or even a specific title, scene, frame, the worse the quality of encoded video will be perceived to a viewer when the same amount of bitrate is spent during the encoding. However, encoding the video using a higher bitrate may require additional storage space and bandwidth to transmit the video. Thus, when optimizing an encoding process, a balancing of factors may be required to determine what bitrate or bitrates to use. FIG. 3, described below, illustrates how different content may have different complexities and that the content complexity is related to a target bitrate.

One solution is to use an encoding ladder and apply the ladder to all types of content. The ladder may be a listing of encoding configurations outlining a spectrum of bitrate/resolution combinations to be used to encode video content. An encoder or transcoder may be used to create, for each received instance of video content, a set of time-aligned video streams, each having a different bitrate and resolution. This set of video streams may be referred to as the ladder or the compression ladder. It may be useful to have different versions of the same video streams in the ladder, as downstream users may have different bandwidth, screen size, or other constraints.

However, using a one-size-fits all ladder approach fails to account for differences in content complexity. Indeed, it has been shown that the encoding ladder should be content-adaptive, and that there can be encoding efficiencies in providing per-title, per frame, and/or per scene optimization. Thus, identifying a usable complexity measure may be one of the factors to consider when performing encoding optimization.

Described herein is a video encoding complexity measure system that may be used to describe the bitrate-quality relationship during encoding. Instead of using a one size fits all encoding ladder, a per-bucket encoding approach may be utilized that accounts for content complexity. Each bucket may be used for content having the same range of levels of complexity, and may be associated with an encoding ladder used to encode content of that level of complexity. When a new source is received, the complexity may be measured, and the content may be placed in the correct bucket. The content may then be encoded using the ladder corresponding to the bucket. Accordingly, the video content may be automatically encoded using a ladder optimized to the level of complexity of the content.

Figure 1:
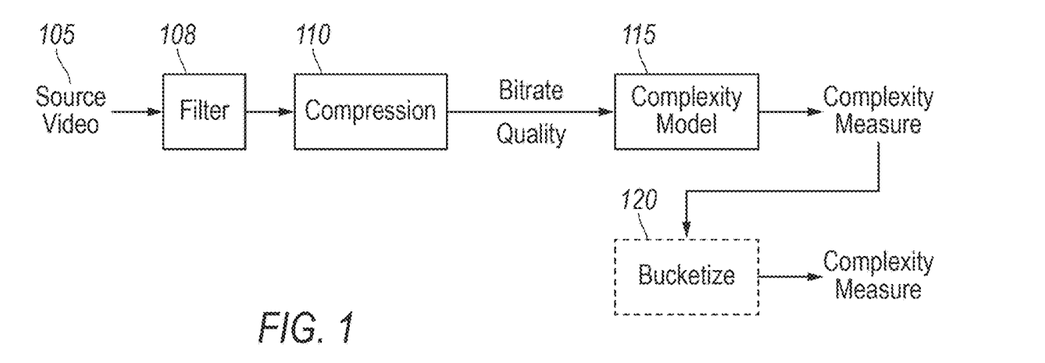
FIG. 1 illustrates an example block diagram of a video encoding complexity measure system.

FIG. 1 illustrate an example block diagram of a video encoding complexity measure system 100. The system may receive a source video 105. The source video 105 may include frames of varying complexities. As explained in further detail herein, the source video 105 is provided to an a filter block 108, which may denoise, sharpen, scale, provide frame rate conversion etc. A compression block 110 may encode the source video 105 (using a codec such as VP9, H264, MPEG-2, etc.), which may identify a complexity target bitrate and quality of the source video 105. A complexity model block 115 uses the bitrate and quality information to determine a complexity measure of the source video 105. The complexity measure is provided to a bucketize block 120 that categorizes the source video 105 according to the complexity measure. Each bucket may then be encoded according to a ladder specific to the complexity of that bucket.

For example, the buckets may be divided into "low complexity," "mid complexity" and "high complexity" buckets. Each bucket may be associated with certain complexity scores. In one example, the low complexity bucket could include complexity scores of 1-50, the mid complexity bucket could include scores of 51-80, and the high complexity scores could include scores of 81-100. Low complexity content may include animations, slates, talking heads, or other videos source with more simplistic content. Content considered to be part of the mid complexity bucket may include landscapes, sports, action content, etc. High complexity content that may be dividing into the high complexity bucket may include more elaborate sporting and action content. The high complexity content may also include content with high amounts of details. This may include nature content (water, trees), high zoom content, etc.

The buckets may be divided with certain complexity ranges based on default complexities. Additionally or alternatively, the buckets may be divided into certain ranges based on user preferences. The user preferences may include the number of buckets and ranges for the buckets. In one example, a user may select a "still complexity" bucket. In this example, the complexity range may be scores from 0-20 and may include still content, such as images, etc. The low complexity bucket may include a range of 21-50, the mid complexity bucket may include a range of 51-80, and the high complexity bucket may include a range of 81-100.

For different libraries different bucket ranges may be used. In some examples, a certain library may include more content that fits within one range than another. For example, most content of one library may fit within the mid complexity bucket. In this situation, the particular bucket may be subdivided further. For example, buckets may be organized into ranges include 40-60, 61-70, and 71-80. Thus, the buckets may be generated or created in view of specific library content to best accommodate the complexity of the content within the specific library. As explained, each bucket may be mapped to a set of encoding parameters that may be used programmatically.

Figure 2A:
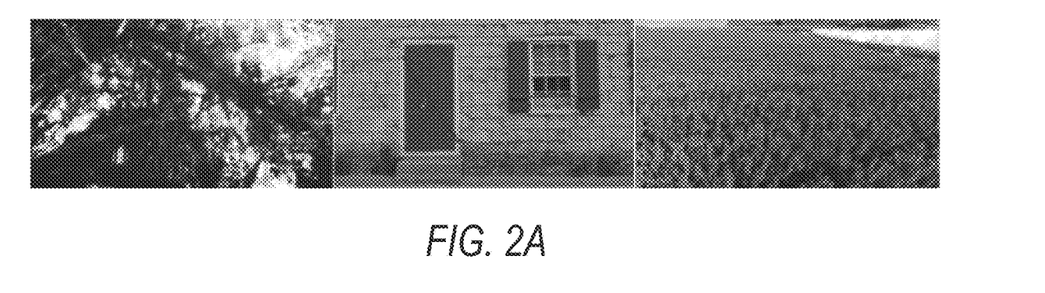
FIG. 2A illustrates examples of images with high content complexity.
Figure 2B:
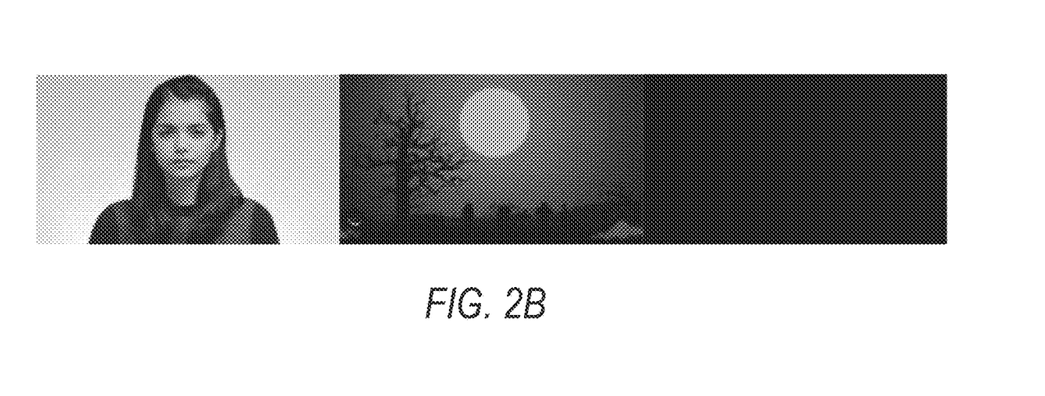
FIG. 2B illustrates examples of images with low content complexity.

Referring to FIG. 2A, examples of images with high content complexity are illustrated. FIG. 2B illustrates examples of images with low content complexity. Typically, complexity is broken into two forms, content complexity and encoding complexity. Often the complexities are the same in most instances. Content complexity generally refers to how complex the video is in terms of its spatial and temporal information. Encoding complexity generally refers to the complexity required for encoding. The encoding complexity may depend on the metadata of the video such as the resolution, framerate, bitdepth, etc., as well as the encoder's capabilities. The encoding complexity may span a wider range of space from a complexity measure perspective.

Returning to FIG. 1, various approaches may be used to measure the content complexity of a video stream. These approaches may include, as some examples, image feature extraction and mathematical modeling, image feature extraction and classification using a neural network, and precoding and analysis. Notably, the former two approaches do not consider the behavior of video compression/decompression (codec). In such approaches, a one-pass encoding and analysis of the bitrate may suffice.

The compression block 110 may be configured to determine a bitrate and quality of received source video and may apply encoding to the source video. In an example, the encoder may perform VP9 encoding, which is useful for video streams having resolutions greater than 1080p and supports color spaces Rec. 601, Rec. 709, Rec. 2020, SMPTE-170, SMPTE-240, and sRGB, as well as HDR video. It should be noted that use of VP9 is one example, and encoding using other video encoding formats such as MPEG-2 Part 2, MPEG-4 Part 2, H.264 (MPEG-4 Part 10), HEVC, Theora, RealVideo RV40, and AV1 may be used. Regardless of codec, the compression block 110 may take into consideration various criteria when selecting the configuration for the encoding. As one example, the accuracy of the rate control model may be considered. As another example, the speed of encoding may be considered.

The system 100 is based on both the bitrate and quality, and because of this, controlling the bitrate spend may increase the robustness of the model. Various testing of speed and rate control performances may determine the parameters to be used by the compression block 110. The compression block 110 may encode the video stream.

The complexity model block 115 may be configured to determine a complexity measure of the source video. Quality of Experience (QoE) of a video, as used herein, relates to mapping human perceptual QoE onto an objective scale, i.e., the average score given by human subjects when expressing their visual QoE when watching the playback of a video content. For example, a score may be defined on a scale of 0-100, which can be evenly divided to five quality ranges of bad (0-19), poor (20-39), fair (40-59), good (60-79), and excellent (80-100), respectively. An example of a QoE measure is the SSIMPLUS index. As additional complexity in a video may result in a poorer appearance to a human viewer, the complexity score may be determined as an inverse of the quality of experience (QoE) score indicative of human perception of the media content. Continuing with the example of a QoE score having a scale from 0-100, the complexity measure also may be a score having an inverse value from 0-100, computed as shown in Equation (1):

$$\text{Complexity measure} = 100 - \text{QoE score} \quad (1)$$

Further, an error term $\lambda$ may indicate the deviation between the complexity target bitrate and complexity actual bitrate.

$$CC = f(QoE, \lambda) \quad (2)$$

$$\lambda = \text{target bitrate} - \text{actual bitrate}, \quad (3)$$

$$\text{where } f \text{ may be} = (100 - QoE) - \frac{\lambda}{\text{normalization factor}} \quad (4)$$

It should be noted that while useful, this measure may result in an error if a complexity target bitrate fails to match the complexity actual bitrate. For example, when the complexity target bitrate is 1 Mbps, videos having complexity actual bitrates of 0.9 and 1.1 may treated the same since only the QoE score is being considered. Thus, to provide for improved results, the complexity actual bitrate of the source video 105 as determined by the compression block 110 may be used to adjust the complexity measure to account for the difference between complexity target bitrate and complexity actual bitrate.

The bucketize block 120 may be configured to receive the complexity measure and categorize the source video 105 into a complexity bucket accordingly. While the complexity measure may be a score between the values of 0 and 100, in practice, having on the order of 100 buckets may be impractical. Instead, the number of actual buckets may be between three and five. Because users may use terms such as 'high', 'medium', and 'low' to describe the complexity of the video, creating three to five buckets offers simplicity and understanding to the user, while still allowing for optimizations with regard to the ladder being used to be made based on content complexity.

The bucketize block 120 may place the source video into one of a plurality of buckets based on the complexity score. Each bucket may then be encoded according to a ladder specific to the complexity of that bucket. This may allow for more efficient and optimized encoding of the source video 105 using a ladder specific to the complexity of the content in view of the bitrate of the content.

In some examples, where videos are under a certain threshold, such as 10 seconds, the rate-control may not converge. In other examples where the videos are over another threshold, such as 60 minutes, the simple average of per-frame complexity scores might also be inaccurate. These videos may benefit from a smart aggregation method.

FIG. 3 illustrates an example graph of a rate-distortion (RD) curve generated by the VP9 1-pass encoding. The performance of the encoding (the compression block 110) may be evaluated on the current. As illustrated in the example graph of FIG. 3, the RD curves overlap. This may indicate that the video complexity is related to the target bitrate.

Figure 4:
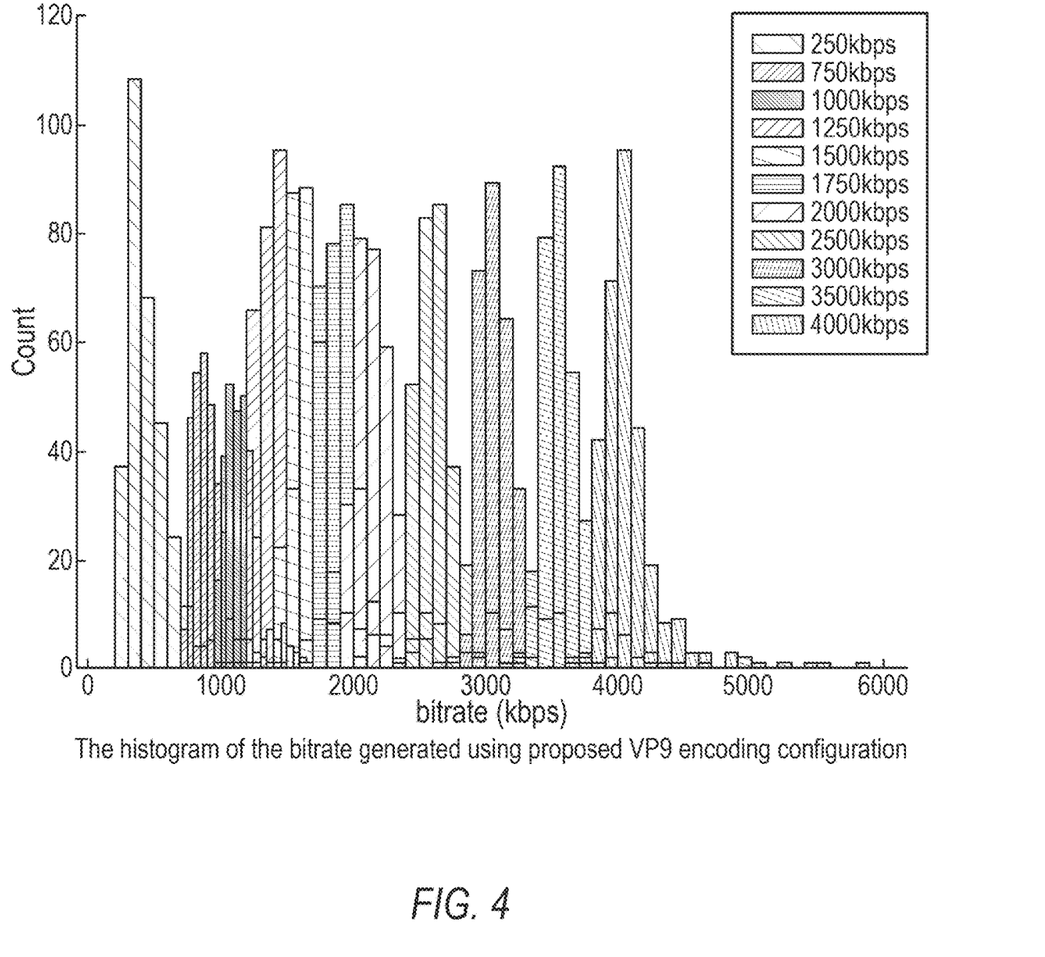
FIG. 4 illustrates an example histogram of the complexity target bitrate generated using the proposed codec encoding configuration.

FIG. 4 illustrates an example histogram of the complexity actual bitrate generated using the proposed encoding configuration. The performance of the rate control model in the codec has direct impact on the complexity prediction.

Figure 5:
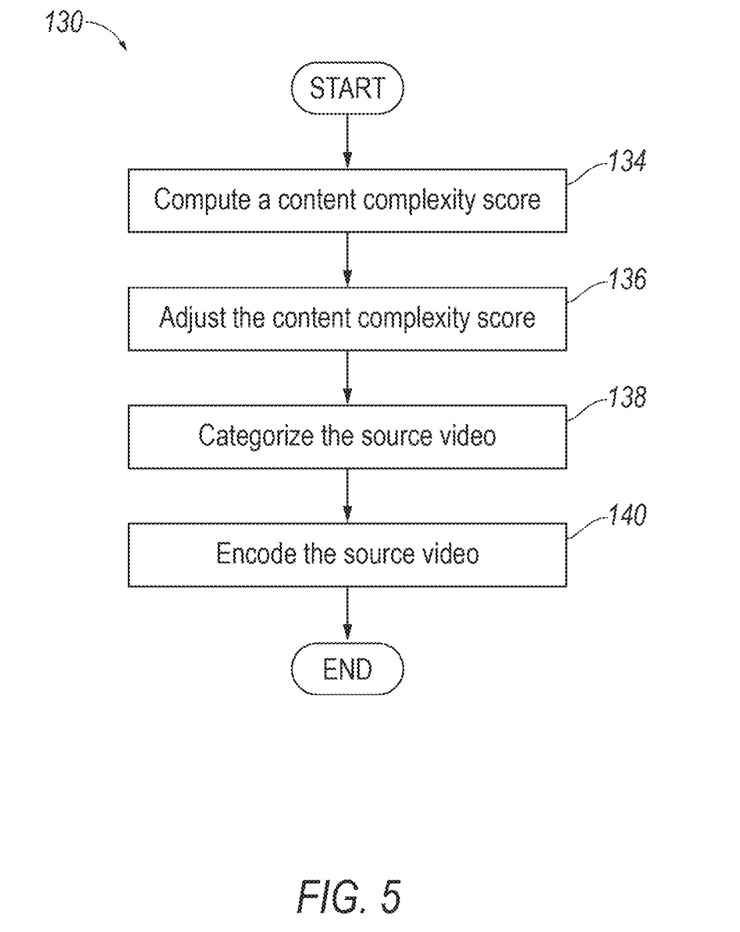
FIG. 5 illustrates an example flow chart for the system.

FIG. 5 illustrates an example process 130 for classifying source video 105 for encoding optimization.

At block 134, the system 100 may compute a content complexity score of the encoded source video. As explained above, the content complexity score may indicate a measure of how detailed the source video is in terms of spatial and temporal information.

At block 136, the system 100 may adjust the content complexity score to account for any difference between the complexity target bitrate and the complexity actual bitrate.

At block 138, the system 100 may categorize the source video 105 into one of a plurality of buckets according to the content complexity score as adjusted. As explained, each bucket may represent a category of video content having a different range of content complexity scores and being associated with a ladder specific to the range. The categorization of the content may depend on the complexity score and which range the complexity score falls into for that specific bucket arrangement. As explained herein, default buckets, as well as customizable buckets may be used to categorize the source video 105. The ranges may be library specific, and each bucket is associated with specific encoding parameters.

At block 140, the system 100 may encode the source video according to the ladder of the bucket into which the source video 105 was categorized.

Figure 6:
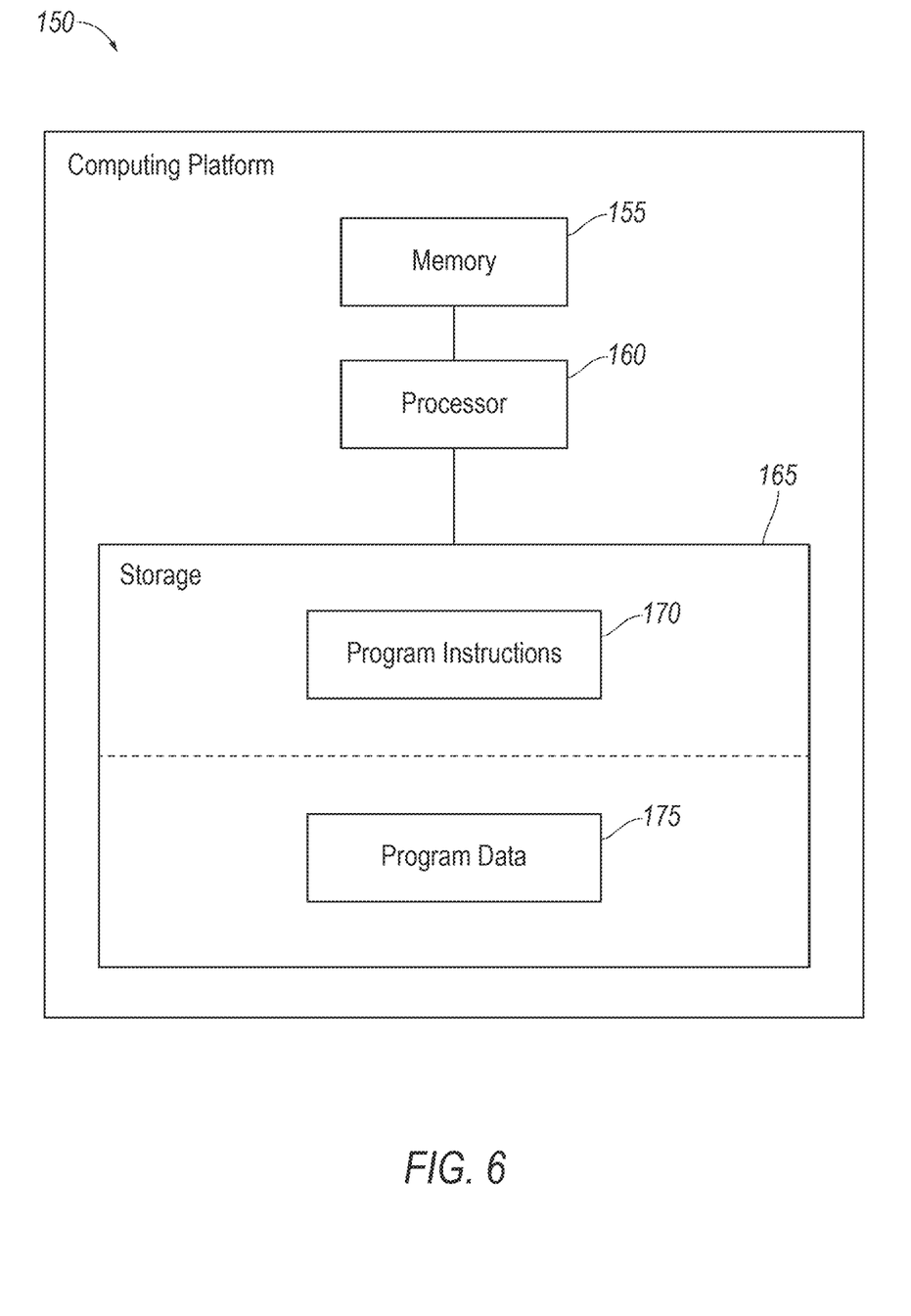
FIG. 6 illustrates an example computing device for performing the methods and processes described herein.

FIG. 6 illustrates an example computing device 150 for performing the methods and processes described herein, including the process 130 of FIG. 5 and system of FIG. 1. The algorithms and/or methodologies of one or more embodiments discussed herein may be implemented using such a computing device. For instance, the operations performed herein, such as those of the process of the system 100 of FIG. 1, may be implemented with such a computing device 150. The computing device 150 may include memory 155, processor 160, and non-volatile storage 165. The processor 160 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 155. The memory 155 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 165 may include one or more persistent data storage devices such as a hard drive, optical drive, tape drive, non-volatile solid-state device, cloud storage or any other device capable of persistently storing information.

The processor 160 may be configured to read into memory 155 and execute computer-executable instructions residing in program instructions 170 of the non-volatile storage 165 and embodying algorithms and/or methodologies of one or more embodiments. The program instructions 170 may include operating systems and applications. The program instructions 170 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 160, the computer-executable instructions of the program instructions 170 may cause the computing device 150 to implement one or more of the algorithms and/or methodologies disclosed herein. The non-volatile storage 165 may also include data 175, such as the video database, supporting the functions, features, and processes of the one or more embodiments described herein. This data 175 may include, as some examples, data of the video streams of the source video 105, the ground truths, complexities, etc.

Thus, disclosed herein is a pixel-based method to summarize the relationship of compression rate and quality (e.g., as a Bjontegaard rate difference or BD rate) using SSIM-PLUS. Further discloses are methods to generate a BD rate curve based on resolution, to generate a BD rate curve based on codecs and encoder configurations, to generate a BD rate curve based on frame rates, to generate a BD rate curve based on viewing devices, to generate a BD rate curve based on dynamic range, or any combination of the same. The BD rate may be displayed, and certain settings may be adjusted based on the BD rate. In one example, the bucket ranges may be adjusted based on the BD rate. The bucket ranges may also be adjusted based on the compression rate or the quality as well. The buckets are designed to group similarly complex content and apply encoding based on the ladder. The ranges for each bucket indicate the complexity of the content to be categorized in each bucket.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method for classifying video for encoding optimization, comprising:
   computing a content complexity score of a video, the content complexity score indicating a measure of how detailed the video is in terms of spatial and temporal information, wherein the complexity score is a function of a human perceptual quality of experience score, such that a higher complexity score relates to a lower perceptual quality of experience and a lower complexity score relates to a higher perceptual quality of experience;
   adjusting the content complexity score to account for any difference between a target bit rate and the actual bitrate,
   categorizing the video into one of a plurality of buckets according to the content complexity score as adjusted, each bucket representing a category of video content having a different range of content complexity scores and being associated with a ladder specific to the range; and
   encoding the video according to the ladder of the one of the plurality of buckets into which the video is categorized.

2. The method of claim 1, further comprising performing a pixel-based method to summarize a relationship of compression rate and quality (BD rate) using SSIMPLUS.

3. The method of claim 1, further comprising generating a BD rate curve based on a resolution of the video.

4. The method of claim 1, further comprising generating a BD rate curve based on codecs and encoder configurations.

5. The method of claim 1, further comprising generating a BD rate curve based on a frame rates of the video.

6. The method of claim 1, further comprising generating a BD rate curve based on a viewing device configured to display the video.

7. The method of claim 1, further comprising generating a BD rate curve based on a dynamic range of the video.

8. A system for classifying video for encoding optimization, comprising:
   a processor programmed to
      identify an actual bitrate of a video encoded at a target bitrate;
      generating a BD rate curve based on a dynamic range of the video;
      compute a content complexity score of the video, the content complexity score indicating a measure of how detailed the video is in terms of spatial and temporal information;
      categorize the video into one of a plurality of buckets according to the content complexity score, each bucket representing a category of video content having a different range of content complexity scores based on the BD rate curve and being associated with a ladder specific to the range; and
      encode the video according to the ladder of the one of the plurality of buckets into which the video is categorized.

9. The system of claim 8, wherein the processor is further programmed to compute the complexity score as an inverse of a human perceptual quality of experience score, such that a higher complexity score relates to a lower perceptual quality of experience and a lower complexity score relates to a higher perceptual quality of experience.

10. The system of claim 8, wherein the processor is further programmed to adjust the content complexity score to account for any difference between the target bitrate and the complexity target bitrate, wherein the categorizing of the video into one of a plurality of buckets is in accordance with the content complexity score as adjusted.

11. The system of claim 8, wherein the processor is further programmed to perform a pixel-based method to summarize a relationship of compression rate and quality (BD rate) using SSIMPLUS.

12. A non-transitory computer readable medium comprising instructions for classifying video for encoding optimization, that, when executed by a processor of a computing device, cause the computing device to perform operations including to:
   identify an actual bitrate of a video encoded at a target bitrate;
   generate a BD rate curve based on at least one of a resolution of the video, generate a BD rate curve based on codecs and encoder configurations, generate a BD rate curve based on a frame rates of the video, generate a BD rate curve based on a viewing device configured to display the video or generate a BD rate curve based on a dynamic range of the video;
   compute a content complexity score of the video, the content complexity score indicating a measure of how detailed the video is in terms of spatial and temporal information;
   categorize the video into one of a plurality of buckets according to the content complexity score, each bucket representing a category of video content having a different range of content complexity scores and based on the BD rate curve and being associated with a ladder specific to the range; and
   encode the video according to the ladder of the one of the plurality of buckets into which the video is categorized.

13. The medium of claim 12, further comprising instructions that, when executed by the processor of the computing device, cause the computing device to compute the complexity score as an inverse of a human perceptual quality of experience score, such that a higher complexity score relates to a lower perceptual quality of experience and a lower complexity score relates to a higher perceptual quality of experience.

14. The medium of claim 12, further comprising instructions that, when executed by the processor of the computing device, cause the computing device to adjust the content complexity score to account for any difference between the target bitrate and the actual bitrate, wherein the categorizing of the video into one of a plurality of buckets is in accordance with the content complexity score as adjusted.

15. The medium of claim 12, further comprising instructions that, when executed by the processor of the computing device, cause the computing device to perform a pixel-based method to summarize a relationship of compression rate and quality (BD rate) using SSIMPLUS.

16. The medium of claim 12, wherein the plurality of buckets include a first bucket having a first range and a second bucket having a second range different from the first range and further comprising instructions that, when executed by the processor of the computing device, cause the computing device to categorize the video into one of the first range or the second range according to the content complexity score.

* * * * *